Dec. 22, 1970  G. SWIFT  3,550,077
VEHICLE GUIDANCE SYSTEM
Filed Feb. 27, 1967  2 Sheets-Sheet 1

GILBERT SWIFT
INVENTOR.

BY William E. Johnson Jr.
ATTORNEY.

Dec. 22, 1970   G. SWIFT   3,550,077
VEHICLE GUIDANCE SYSTEM
Filed Feb. 27, 1967   2 Sheets-Sheet 2

GILBERT SWIFT
INVENTOR.

BY William E. Johnson Jr.
ATTORNEY.

3,550,077
VEHICLE GUIDANCE SYSTEM
Gilbert Swift, Houston, Tex., assignor to Dresser Industries, Inc., Dallas, Tex., a corporation of Delaware
Filed Feb. 27, 1967, Ser. No. 618,984
Int. Cl. G08g 1/00
U.S. Cl. 340—32                                               1 Claim

ABSTRACT OF THE DISCLOSURE

A buried wire beneath the travel path of a vehicle provides electrical signals to the vehicle as a means for steering the vehicle along a predetermined route.

BACKGROUND OF THE INVENTION

Figure 1:
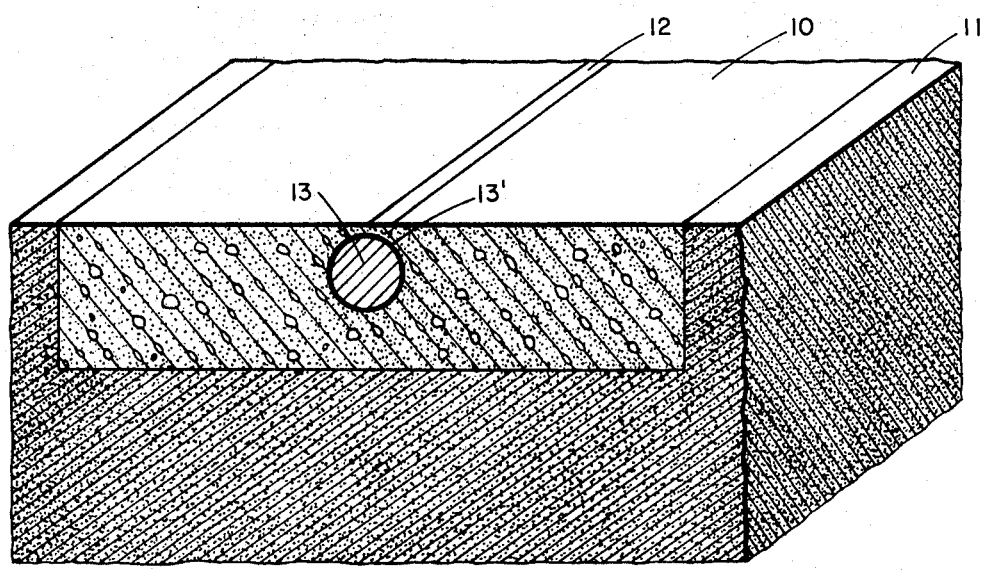

This invention relates to a guidance system for mobile vehicles traveling on the earth's surface. In particular, the invention relates to a guidance system for vehicles such as motor vehicles, and the like which, when traveling on the ground, are ordinarily manually guided or steered along a desired path of travel by a human operator. Such vehicles may, for purposes of this description, be termed "free-steering" to distinguish them from other mobile vehicles such as trains or rail cars for which the rails on which they run provide a fixed path of travel rendering their steering independent of the actions of their operators. More particularly, but not by way of limitation, the invention relates to a guidance system for a vehicle which is ordinarily used to paint stripes along the center line of a highway.

Streets and highways are ordinarily provided with center or lane stripes or other physical markers to guide an operator in steering vehicles along such streets or highways. Proper guidance of the vehicles depends on continued visual observation of such markers by the vehicle operator to keep the vehicle moving in proper relation to the markers. Operators of vehicles such as automobiles, trucks, and the like, are all too familiar with the often disastrous results of failure to maintain continuous observation of the guide stripes or other markers. Momentary distractions of the operator's attention from the guide markers, as by temporary blindness caused by opposing lights, falling asleep at the wheel, or for other reasons, may cause the vehicle to wander from a proper and safe path into an oppositely moving line of traffic or ditches, culverts, bridge rails or other dangerous hazards which may be present along the path of travel.

The difficulties of maintaining a vehicle in proper relation to conventional guide stripes or markers, as is well known, is greatly intensified under conditions of darkness, as when driving at night, or in heavy fogs, or during rainstorms and the like.

Still another problem is associated with vehicles which are utilized to paint the stripes along the center line of the highway. The techniques used in painting the stripes normally require resurveying the highway periodically to establish the desired line and then a manual guidance of the vehicle along the surveyed path. It should be appreciated that resurveying the highway to locate the desired center line path is costly and undesirable.

The primary object of the present invention, therefore, is to provide an improved guide means which furnishes a continuous indication of the position of a free-steering vehicle relative to a guide path, without requiring visual observation of a guide line or marker by the operator to steer the vehicle on a desired path of travel.

Another object of the invention is to provide an improved guidance system for a vehicle normally used to paint the center stripes on highways and streets which enables the center stripe to be painted without a resurveying of the desired center stripe location.

Briefly stated, this invention contemplates the employment of a conductor cable which is buried beneath the desired path of travel in the street, and a detector mounted on the vehicle, the detector being responsive to electrical signals induced from the buried conductor line to provide an indication of the position of the vehicle relative to the buried conductor cable.

In accordance with this invention, a guide line for the path to be traveled by the vehicle is defined by means of the magnetic field produced by current in the buried conductor cable which is normally invisible to the eye. The relative magnitude of signals induced in a detector may be employed in a well known manner to generate an appropriate electric impulse or signal which may, in turn, be employed to actuate a visible or audible signaling device, or to automatically control the steering mechanism of the vehicle in order to maintain the vehicle in a fixed or predetermined relation to the guide line.

By means of the present invention, a vehicle may be effectively and safely guided along a predetermined path of travel under conditions of complete darkness, in which ordinary guide markers would be completely invisible to an operator. Likewise, a vehicle which is normally used to paint the center stripe of a highway may travel along the street painting a new center stripe without resort to resurveying the highway or attempting to follow the old and partially deleted center stripe.

The invention has numerous applications and, particularly, many military applications. For example, under battle conditions it is often necessary to move vehicles carrying men and supplies over areas exposed to enemy fire. The safest time for such movements will ordinarily be at night under cover of darkness. However, heretofore, the hazards attending such movements have been very great and required the use of headlights which, even though greatly dimmed, would nevertheless be observed by an enemy.

With the present invention, a buried conductor cable could first be laid down within the ground to define a path to be followed by such vehicles, and the vehicles could then be directed along such a path in total darkness, without the use of any lights, merely by following indications provided by the electromagnetic detector. Similar guidance would be provided under conditions of heavy fog.

Airplane runways could be marked in a similar manner which would enable airplanes to take off from a completely darkened field and thereby avoid the need for the more conventional illuminated runway markers or other visible guide means which might otherwise attract the attention of an enemy.

Many other objects and advantages of this invention will become more readily apparent from the following detailed description when read in conjunction with the accompanying drawings, which illustrate several useful embodiments in accordance with this invention.

Figure 2:
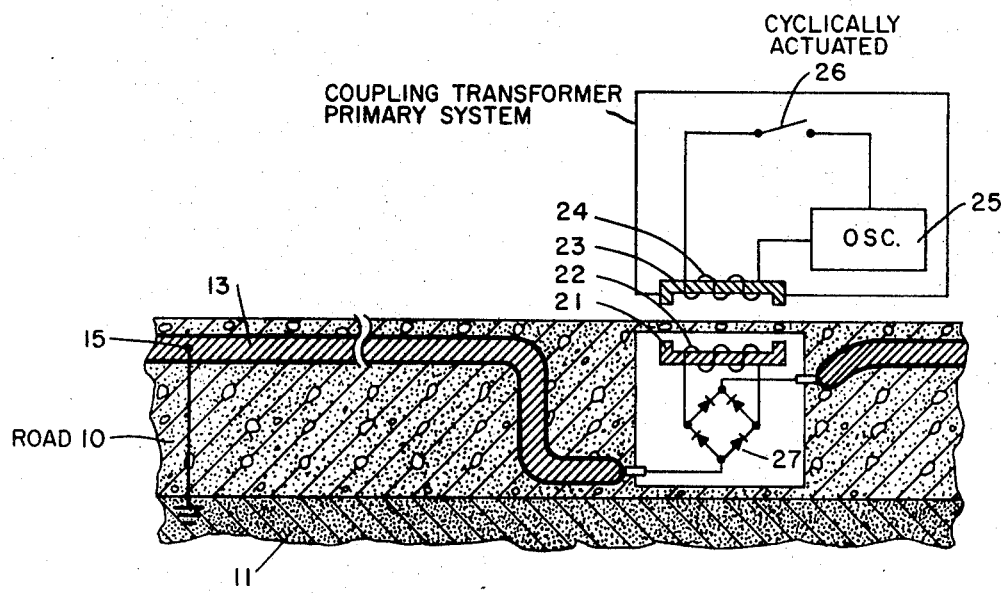
Figure 3:
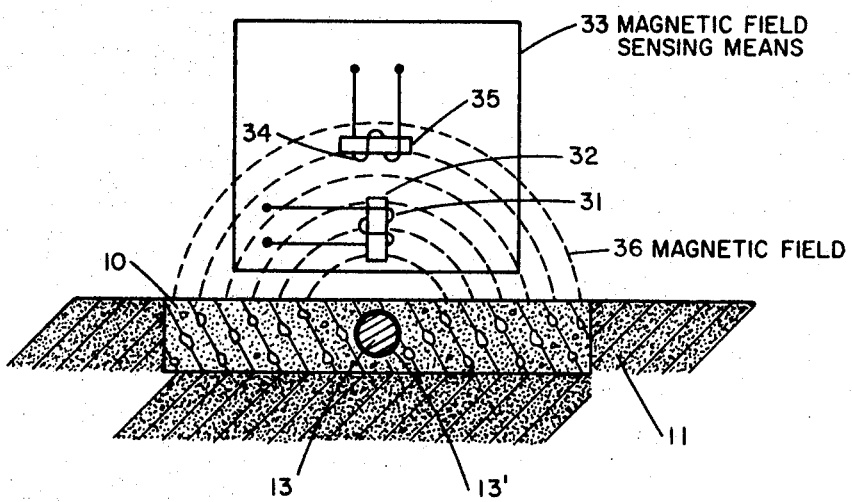

FIG. 1 shows a highway with a marker cable, FIG. 2 shows a mode of energizing said cable, and FIG. 3 shows a use of such cable.

Referring now specifically to FIG. 1, there is shown a section of a cement roadway or highway 10 which is embedded within the earth's surface 11. A marker or center line 12 is suitably disposed on the roadway to define its longitudinal center line or some other lane or segment of the roadway extending generally parallel to the desired path of travel of the vehicle (not shown) and to one side thereof.

A conductor cable 13, composed of any electrically conducting material, for example, copper, is disposed or buried beneath the line 12 and generally running parallel thereto. The conductor cable 13, drawn larger for the sake of clarity, would preferably be buried along the exact route directly beneath the center line 12 which is either to be painted or to be followed by a vehicle as a means of guidance, but could be placed along any path parallel thereto which would be accessible to the vehicle itself or to booms which would be permitted to extend outward from the vehicle. For adequate precision in guiding the vehicle along the desired path, the wires should not be buried too deeply. An alternative measure would be to have the wire or cable partially exposed to the surface of the highway 10. In the preferred embodiment the distance of the cable beneath the surface should not exceed five or six times the permissible wandering of the vehicle from the desired path. Thus, if a precision of plus or minus two inches is required, the wire should not be buried deeper than one foot below the lowest practical path along which the sensing coil assembly (described hereinafter) mounted on the vehicle can be moved. However, the wire will preferably be buried sufficiently deep to remain in place undisturbed by creepage or other movement of the upper layers of the roadway.

The cable 13 is preferably well insulated with a layer 13', with both the conductor and the insulation, for example, nylon, being extremely resistant to abrasion, water, bending, tension and all other environmental effects. Since it is the magnetic field produced by current flow through the wire or cable which will be sensed, means are also provided to supply such a current. Accordingly, terminals may be provided at intervals along the length of the wire, at which points current may be introduced into or permitted to flow out of the wire. However, since such terminals may become damaged or may offer access for water, it should be more desirable to induce currents into the system without making any direct electrical connections. This may be done by burying with the conductor cable 13 one-half of a transformer in known locations along the route of the wire.

Referring now to FIG. 2, the "half transformer" 21 comprising an iron core together with a secondary winding 22 cooperate with an iron core 23 having a primary winding 24 placed above the surface in proper proximate relationship to induce an alternating voltage in the secondary winding. In a lengthy system, such "half transformers" might be installed at ten mile intervals along the cable, with the cable being grounded to the earth 11 at points 15 approximately half way between the transformer installations. The secondary winding 22 can be connected either in series with the cable 13 or in shunt from the cable to the earth 11 nearby. An alternating current will be caused to flow through the sections of cable lying in both directions from the transformer location to the locations of the next adjacent grounded points 15. It should be appreciated that if the series connection is used, the current at both sections of the cable 13 will flow in the same direction. If the shunt connection is used, the current will flow oppositely in the two sections. The series connection is preferable for a simple guidance system in order that the system not guide the vehicle toward the wire in one section and away from the wire in the next section or in the transition zone located near the grounded point 15 and also near the transformer sections. However, provision can be made in the system to avoid any misguidance caused by the apparent reversal of current at the transformer locations or at the grounded locations.

It will ordinarily be necessary to temporarily remove the primary portion of the transformer to allow the vehicle to pass unless the secondary portion is located off the path to be followed. If it is desired to maintain guidance but still bury the transformers in the direct path, the discontinuity can be avoided by providing two transformers spaced apart a distance longer than the length of the vehicle, energizing one or both as the vehicle approaches, removing one and then the other to allow passage of the vehicle without interruption of the current.

Since it is desirable to install transformers (or other current entry points) as far apart as possible and yet maintain an adequate magnetic field around the cable for its entire length, it is necessary to employ as low a frequency of alternating current as possible. Direct current (zero frequency) is not regarded as an optimum since the sensing devices required for this would become expensive and would be influenced by the magnetic fields within the earth and other magnetized bodies. Sixty cycles or other frequencies used for power transmission and their multiples should also be avoided for obvious reasons. Accordingly, a frequency in the vicinity of fifteen cycles per second has been found to be desirable. However, a split transformer with several inches separation between the primary and secondary portions of its core can be expected to work very poorly at this frequency. This shortcoming is overcome by a suitable design of the transformer and energizing its primary at a much higher frequency, for example, one thousand cycles, and interrupting the one thousand cycles current repetitiously at the fifteen cycle rate. In such case, the secondary is tuned to one thousand c.p.s. and connected to one or more rectifiers 27, the output of which comprises a pulsating current at the rate of fifteen c.p.s. Thus, a fifteen c.p.s. current is introduced into the buried wire 13 while the two half transformers are working at one thousand c.p.s. The oscillator 25 provides the one thousand c.p.s. signal, the output of which is interrupted by the switch 26 at a rate of fifteen c.p.s. in a manner well known to the art, for example by a relay circuit or a multivibrator circuit.

Referring now to FIG. 3, one embodiment of a detector system for sensing the magnetic field 36 from the cable 13 is illustrated. In the preferred embodiment, a single pick-up coil 31, having a ferromagnetic core 32 is situated in a housing 33 located on the moving vehicle (not illustrated) such as to be vertically oriented with respect to the cable 13. Thus, it should be appreciated that when the pick-up coil 31 is maintained vertically above the cable 13, a null condition exists in the pick-up coil 31. If the vehicle should move to either side from the position illustrated, an alternating voltage of the same frequency as that of the current in the conductor 13 will be produced, of one partciular phase when moved to one side and of opposite phase when moved to the other side. A similar pick-up coil 34 having a ferromagnetic core 35 is oriented horizontally with respect to the cable 13 within the housing 33. Being crosswise to the cable 13, a substantially constant alternating voltage independent of the location of the vehicle will be produced. Thus, the second coil 34 provides a reference signal by means of which the "sense" of the error is determined.

While a single pair of coils is illustrated in the preferred embodiment, it should be appreciated that a plurality of coils can be provided across the width of the vehicle so that one or another of them will always be relatively near the cable 13 to insure that the reference signal is not lost or too greatly diminished.

Combining the amplified "error" signals derived from the first sensor 31 in a conventional phase sensitive detector (not illustrated) with the phase reference signal derived from the second sensor coil 34 produces a direct current voltage algebraically proportional to the departure of the first sensor coil 31 from the path of the conductor cable 13. With the first sensor coil 31 fixedly mounted on the vehicle, in close proximity to the surface 10, above the conductor cable 13, the voltage induced therein represents the departure, if any, of the vehicle from the desired path. Accordingly, this direct current voltage is applied, after suitable filtering and amplification well known in the art, to a position servomechanism (not illustrated) coupled to the steering apparatus of the vehicle. With suitable damping characteristics, the servomechanism will serve to maintain the vehicle on the desired path by continuously restoring it toward the path when any departure occurs.

An arrangement whereby the signals from the detector may be impressed on a suitable and generally conventional servomechanism is illustrated and described in U.S. Pat. No. 2,750,583, issued to Otis J. McCullough on June 12, 1956.

Although a vehicle is not illustrated herein as such, it should be appreciated that the system according to the invention is contemplated for use with vehicles that have at least one wheel which can be steered to provide lateral movement of the vehicle, for example, cars, trucks, trailers, and the like. When it is desired to use the system to guide a vehicle which is used to paint the center or lane stripes on a highway, it should be appreciated that the vehicle itself can be conventional and that only the steering means need be arranged to be controlled by the system according to the invention.

For safety, it is contemplated to render the manual steering of the vehicle by its driver predominant. Since it is preferable that the driver of the vehicle should at all times be able to override the automatic control and cause the vehicle to proceed in the direction the driver selects, rather than the automatically controlled direction, an override system may be installed which is compatible with a system as described. This may be accomplished by installing a force sensing device in the steering wheel shaft (not illustrated). Whenever a turning force is exerted by the driver of the vehicle, the sensing device will produce a signal which is utilized to block or otherwise reduce to zero the force exerted by the servomechanism. However, such a driver override is not considered to be a limitation upon the invention and need not be included in a vehicle guidance system according to the invention.

Another feature of the invention relates to a means and method for locating faults or breaks in the buried conductor cable 13. A ground at an unwanted location along the cable 13 can be detected simply by carrying a pickup coil, such as the reference sensors 34 and 31, along the surface above the buried conductor. The operator should notice a sharp attenuation in signal strength, even perhaps to zero, after passing the area of the cable 13 which has been inadvertently grounded. However, should the cable 13 be broken, the normal current through the cable would be discontinued. It has been discovered that if a relatively high voltage at a relatively high frequency, for example, at 50 kc., is induced into the primary coil 24 of FIG. 2, a relatively high voltage at the relatively high frequency is induced on the cable 13 out to the point of the break. The high frequency, high voltage signal would be preferably capacitor coupled into the primary coil 24. Alternatively, a second "half transformer" could be coupled into the system for inducing the signal onto the cable 13 if the coil 24 is not designed to handle the high voltage, high frequency signal. An operator could then carry a capacitive probe, with an amplifier and detector (not illustrated) along the surface to detect the point of the break. The "high voltage" signal could be of any desirable voltage amplitude, for example, 300 volts, to provide a signal to the detector. For ease of detection, the high frequency signal should be audio-modulated, for example, at 1 kc., to provide a distinctive tone at the detector.

Another feature of the invention relates to a method for locating a buried transformer. A sensing coil assembly as is illustrated in FIG. 3 is placed above the cable 13. The operator then moves along the path above the cable with an energized primary coil 24. Whenever the primary coil 24 comes near the buried transformer coil 22, a signal will be received in the sensing coil assembly, thus indicating to the operator that the primary coil is above the buried half of the transformer.

While the invention has been illustrated and described with respect to the preferred embodiments, it should be apparent to those skilled in the art that many changes, modifications and embodiments may be made without departing from the invention in its broader aspects. Accordingly, the invention is not to be limited, except as defined in the appended claim.

What is claimed is:

1. In a vehicle guidance field energizing system, including an electrically conducting member defining a travel path over a surface traversed by a vehicle, a source of electric current energizing said member and magnetic field sensing means positioned on the vehicle being responsive to the magnetic field resulting from the flow of electric current along said conducting member, said system being characterized by said source of electric current being transformer coupled to said conducting member, said transformer comprising a primary coil above said surface and a secondary coil beneath said surface, wherein said source of electric current supplies power to said primary coil of one frequency, said source of electric current including means to interrupt said current at a lower second frequency and rectifier means connected between said secondary coil and said conducting member, whereby said conducting member is energized with current fluctuating at said second frequency.

References Cited

UNITED STATES PATENTS

| 2,980,793 | 4/1961 | Daniel | 340—32 |
| 3,160,369 | 12/1964 | Edmison | 340—26 |
| 3,274,546 | 9/1966 | Gunn | 340—25 |

THOMAS B. HABECKER, Primary Examiner

U.S. Cl. X.R.

94—1; 321—9